United States Patent [19]

Castle et al.

[11] Patent Number: 5,213,968
[45] Date of Patent: May 25, 1993

[54] PROCESS FOR PREPARING EMULSIFYING AGENTS

[75] Inventors: Edward R. Castle, Gaylordsville; Steven S.-Y. Kwon; Dharam V. Vadehra, both of New Milford, all of Conn.

[73] Assignee: Nestec S.A., Vevey, Switzerland

[21] Appl. No.: 816,846

[22] Filed: Dec. 31, 1991

Related U.S. Application Data

[63] Continuation of Ser. No. 583,073, Sep. 14, 1990, abandoned, which is a continuation-in-part of Ser. No. 396,851, Aug. 21, 1989, abandoned.

[51] Int. Cl.[5] .................. C12P 21/00; C12P 7/64; C12N 9/50; A23L 1/19
[52] U.S. Cl. ................................. 435/68.1; 426/63; 426/580; 426/589; 426/601; 426/602; 426/605; 426/654; 435/134; 435/198; 435/219
[58] Field of Search .............. 435/68.5, 134, 198, 435/219; 426/63, 580, 589, 601, 602, 605, 654

[56] References Cited

U.S. PATENT DOCUMENTS

| | | | |
|---|---|---|---|
| 3,260,606 | 7/1966 | Azuma et al. | 426/47 |
| 3,974,294 | 8/1976 | Schwille et al. | 426/32 |
| 4,034,124 | 7/1977 | van Dam | 426/602 |
| 4,500,549 | 2/1985 | Crossman | 426/33 |
| 4,713,250 | 12/1987 | Tonyes et al. | 426/2 |
| 4,804,549 | 2/1989 | Howley et al. | 426/602 |
| 5,028,447 | 7/1991 | Schenk | 426/605 |
| 5,082,674 | 1/1992 | Carrell et al. | 426/589 |

FOREIGN PATENT DOCUMENTS

| | | |
|---|---|---|
| 60-62951 | 4/1985 | Japan . |
| 62-29950 | 2/1987 | Japan . |
| 0233750 | 9/1988 | Japan . |

OTHER PUBLICATIONS

Translation of Japanese Patent Application No. 62-65820.

*Primary Examiner*—Herbert J. Lilling
*Attorney, Agent, or Firm*—Vogt & O'Donnell

[57] ABSTRACT

Emulsifying agents are prepared by sequentially treating a biological material with a protease and with a lipase. The enzymatically treated biological material may be pasteurized during or following the enzymatic treatment.

23 Claims, No Drawings

PROCESS FOR PREPARING EMULSIFYING AGENTS

CROSS-REFERENCE TO RELATED APPLICATION

This application is a continuation of Ser. No. 07/583,073 filed Sept. 14, 1990 now abandoned which application is a continuation-in-part application of Ser. No. 07/396,851, filed Aug. 21, 1989, now abandoned.

BACKGROUND OF THE INVENTION

The present invention relates to a process for the preparation of an emulsifying agent and, more particularly, to an enzyme modified material containing a lipid together with a lipoprotein and/or a protein.

Egg yolk is often used as an emulsifying agent in mayonnaise, soups and sauces, etc. However, such emulsions cannot be heat sterilised because the sterilisation temperature breaks the emulsion owing to the coagulation of the egg yolk. It is therefore often necessary that the pH of emulsions stabilised by egg yolk be lower than desired for taste requirements in order to obtain satisfactory microbiological storage stability.

Japanese Patent Application No. 56465/62 describes a process for producing a butter-like food with the flavour of eggs, in which a group of enzymes obtained from fungi is added to egg yolk or whole egg liquid to effect the enzymatic action until it loses its thermosetting properties, inactivating the enzyme, and adding edible oil and a hydrophilic emulsifier to the liquid to emulsify. The group of enzymes may include proteolytic enzymes, a lipase, a lecithin decomposition enzyme, amylases, as well as an enzyme participating in nucleic acid decomposition and an enzyme acting on a flavour precursor. However, in this process, a considerable amount of emulsifier is added to emulsify the product.

U.S. Pat. No. 4,034,124 describes a water and oil emulsion which contains a phospholipo-protein containing material which has been modified by phospholipase A.

SUMMARY OF THE INVENTION

We have now developed a process for the preparation of 35 emulsifying agents by enzyme modifying a biological material containing a lipid as well as a lipoprotein and/or a protein e.g. egg yolk, which involves treating the biological material with a protease and a lipase to give a product which is a stable emulsifying agent without the addition of a further emulsifier and which imparts superior heat-stability to a water and oil emulsion when compared with the emulsion described in U.S. Pat. No. 4,034,124.

Accordingly, the present invention provides a process for the preparation of an emulsifying agent which comprises treating a biological material containing a lipid, as well as a lipoprotein and/or a protein, with a protease and a lipase, and pasteurising the product.

DETAILED DESCRIPTION OF THE INVENTION

The process of this invention is applicable to any biological material containing a lipid, as well as a lipoprotein and/or a protein, especially materials containing phospholipoprotein, such as egg yolk, soybean, wheat protein, casein, whole egg, cream, butter, whey, anhydrous milk fat, etc. Especially desirable emulsifying agents are obtained when the biological material contains phospholipids and/or phospholipoproteins.

When egg yolk is used as the biological material, the egg yolk may be fresh, frozen or dehydrated and it may be treated alone or in the presence of sugar or salt.

The treatment with the protease and the lipase may be carried out in any order or simultaneously but preferably the biological material is treated with a lipase after being treated with a protease.

Before treatment, the biological material is advantageously heated to the temperature of the treatment in a vessel suitable for controlling temperature and, if desired, agitation conditions.

Any protease may be employed in the process of this invention. The amount of protease of approximately 600 USP units per mg used may be from 0.025 to 2%, preferably from 0.04 to 1% and especially from 0.05 to 0.5% by weight based on the weight of the biological material. The protease is conveniently dissolved in water before mixing with the biological material or, if desired, a small amount of water sufficient to dissolve the enzyme, for example, from about 2 to 5% by weight based on the weight of the biological material, may be added to the biological material before mixing with the enzyme. Conveniently, the enzyme is dispersed uniformly throughout the biological material, for instance by agitation.

The upper limit of the temperature of the treatment with the protease is not usually above 65° C. because at this temperature denaturation of the enzymes has commenced. Therefore the temperature is preferably from 0° C. to 55° C. more preferably from 35° C. to 45° C. and especially from 37° C. to 43° C.

The treatment with the protease is preferably carried out at a pH from 4 to 8.5. For instance, the treatment of egg yolk is preferably performed at a pH from 6.05 to 6.15 which is the natural pH of fresh egg yolk. If desired, adjustment of the pH may be effected by any suitable food acceptable acidulants such as HCl, acetic acid, lactic acid or citric acid etc, or alkalis such as sodium hydroxide, potassium hydroxide, sodium citrate or disodium phosphate etc.

The duration of the treatment with the protease may vary widely depending, for example, on the particular protease used, the concentration of the protease and the temperature. For example, the duration of the incubation may be up to 24 hours or more but typically the time ranges from 30 minutes to 2.5 hours and more usually from 1 to 2 hours.

Any lipase may be used in the process and may be derived from a microorganism such as Mucor sp., *Aspergillus niger, Aspergillus oryzae, Rhizopus oryzae, Candida cylindracea*, Penicillium sp. or from animal origin such as pancreatic lipase porcine pancreas. Pancreatic lipase is preferred commercially available pancreatic lipases a small amount of phospholipase A as impurity.

Before treatment with the lipase, the pH is conveniently adjusted to the optimum pH value of the lipase which may be from 4 to 8.5 depending on the lipase used e.g. when pancreatic lipase is used, the pH is advantageously adjusted to from 4.5 to 7.5. The adjustment of the pH may be effected with any suitable food-acceptable acidulants such as HCl, acetic acid, lactic acid or citric acid, or alkalis such as sodium hydroxide, potassium hydroxide, sodium citrate or disodium phosphate etc.

The amount of lipase of approximately 24 USP units per mg used may be from 0.025 to 3%, preferably from 0.05 to 2% and especially from 0.075 to 1% by weight based on the weight of the biological material. The lipase is conveniently dissolved in water before mixing with the biological material or, if desired, a small amount of water, sufficient to dissolve the lipase for example from 2 to 20% by weight based on the weight of the biological material, may be added to the biological material before mixing with the lipase. Conveniently, the lipase is dispersed uniformly throughout the biological material, for instance, by agitation.

The temperature of the treatment with the lipase is not usually above 60° C. because of the temperature denaturation of the enzymes, and is generally from 0° C. to 55° C., preferably from 35° C. to 45° C. and especially from 37° C. to 43° C. However, significant lipolysis can take place at higher temperature e.g. pasteurisation temperatures, before denaturation has occurred, and in some cases the treatment with the lipase takes place during the pasteurisation step. The duration of the treatment with the lipase may vary widely depending, for example, on the particular lipase used, the concentration of the lipase and the temperature. For example, the duration of the incubation may be up to 24 hours or more but typically the duration is from 15 minutes to 3 hours for instance from 20 minutes to 2 hours. When the treatment with the lipase takes place during the pasteurisation step, the duration may be less than 15 minutes.

Generally, after treatment with the enzymes, the product is pasteurised by any conventional method e.g. 70°–75° C. for a period of from 5 to 30 minutes.

The product may be used in effective amounts as a general emulsifier which is heat stable in such systems as oil in water or water in oil emulsions e.g. sauces; mayonnaises; ice cream; emulsified dairy products; coffee whiteners; aseptic sauces; canned sauces and hot and cold fill sauces. The amount of product in such systems is usually from 0.5 to 3% by weight based on the total weight of the system.

The oil and water system containing the emulsifying product can withstand high temperature (60° C. to 100° C.) retorting and UHT processing and may be stored in a deep-frozen, refrigerated or room temperature state and has a long shelf-life.

EXAMPLES

The following Examples further illustrate the present invention:

EXAMPLE 1

100 g of (10% salted) eye yolk is heated to 43±2° C. in a Lee Kettle and 0.1 g of a protease enzyme (Prozyme 6 Amano International Enzymes) in aqueous solution is added and the mixture incubated for 1.5 hours at 43±2° C. at pH 6.1.

After the incubation, the pH is adjusted to 5.0 with food grade citric acid and 0.2 g of pancreatic lipase (Pancrelipase USP, Biocon) in aqueous solution is added and the mixture incubated for 30 minutes at 43±2° C.

After incubation with the lipase, the product is pasteurised at 75° C. for 5 minutes.

EXAMPLE 2

100 g of egg yolk (10% salted) is heated to 43° C.+2° C. in a Lee kettle and 0.10 g of a protease enzyme (Prozyme 6, Amano International Enzyme) in aqueous solution is added and the mixture incubated with constant agitation for 60 min at 43° C.±2° C. at pH of egg yolk (pH 6.1±0.1).

After the incubation, 0.05 g of lipase (Biocon Pancrelipase USP Biocon) in aqueous solution is added and the mixture is incubated with constant agitation for 60 min at 43° C.±2° C. at pH as is (about 6.0).

After incubation with the lipase, the product is pasteurised at 75° C. for 5 min.

EXAMPLE 3

100 g of egg yolk (salted, 10%) is heated to 43° C.±2° C. in a Lee kettle and 0.05 g of protease enzyme (Prozyme 6, Amano International Enzyme) in aqueous solution is added and the mixture incubated for 60 min at 43° C.±2° C. at pH 6.1.

After the incubation, 0.05 g of lipase (Pancrelipase USP, Biocon) in aqueous solution is added and the mixture is incubated for 60 min at 43° C.±2° C. at pH as is.

After incubation, the product is pasteurised at 75° C. for 5 min.

EXAMPLE 4

100 g of egg yolk (salted, 10%) is heated to 55° C.±2° C. in a Lee kettle and 0.05 g of protease enzyme (Prozyme 6) in aqueous solution is added and the mixture incubated for 60 min at 55° C.±2° C. at pH as is (around 6.0).

After the incubation, 0.05 g of lipase (Pancrelipase USP) in aqueous solution is added and the mixture is incubated for 60 min at 55° C.±2° C. at pH as is.

After the incubation, the product is pasteurised at 75° C. for 5 min.

EXAMPLE 5

100 g of egg yolk (salted, 10%) is heated to 55° C.°2° C. in a Lee kettle, the pH adjusted with food grade sodium hydroxide (10%) solution to pH 7.5, 0.05 % of protease enzyme (Prozyme 6) in aqueous solution is added and the mixture is incubated for 60 min at 55° C.±2° C.

After the incubation, 0.05 g of lipase (Pancrelipase USP) in aqueous solution is added and the mixture is incubated for 30 min at 55° C.±2° C. at pH as is.

After the incubation the product is pasteurised at 75° C. for 5 min.

EXAMPLE 6

100 g of egg yolk (salted, 10%) is heated to 43° C.±2° C. in a kettle and 0.50 g sodium citrate in aqueous solution is added. 0.05 g of protease enzyme (Prozyme 6) in aqueous solution is added and the mixture is incubated for 60 minutes at 55° C.±2° C. The pH is then adjusted to pH 6.6±0.1 with 20% KOH solution and 0.2 g of pancreatic lipase is added. The mixture is incubated for 60 minutes at 43° C.±2° C., and pasteurised for 5 min at 75° C.

The enzyme modified egg yolk thus prepared was used to prepare a water-in-oil emulsion (mayonnaise-like) by mixing the following ingredients in a food processor:

| | |
|---|---|
| 20.0 g | water |
| 20.0 ml | 10% acetic acid |
| 30.0 g | enzyme modified egg yolk |

| | |
|---|---|
| 240.0 g | soy oil |

The viscosity of the emulsion thus prepared was found to be 40550 centipoises.

As a comparison, a water-in-oil emulsion was prepared in a similar manner, but using untreated egg yolk instead of the enzyme modified egg yolk. The viscosity of the emulsion thus prepared was found to be 24900 centipoises.

This demonstrates the effectiveness of the sodium citrate buffered enzyme modified egg yolk in a cold sauce.

EXAMPLE 7

100 g of egg yolk (salted, 10%) was heated to 43° C.±2° C. in a Lee kettle and 0.05 g of protease enzyme (Prozyme 6, Amano International Enzyme) in aqueous solution was added and the mixture incubated for 60 min at 43° C.±2° C. at pH 6.1

After the incubation, 0.05 g of lipase (Pancrelipase USP, Biocon) in aqueous solution was added and the mixture was incubated for 60 min at 43° C.±2° C. at pH as is (about 6.0).

The enzyme modified egg yolk thus prepared was used to prepare Hollandaise sauce in the following manner.

An oil-in-water emulsion was prepared by mixing at 40 rpm, the following ingredients:

| | |
|---|---|
| 292.0 g | water |
| 18.6 g | spice blend |
| 14.2 g | egg yolk, enzyme modified as prepared above |

While mixing, the following ingredients were added in the order indicated:

| | |
|---|---|
| 10.0 g | starch |
| 250.0 g | soy oil |
| 7.9 ml | lemon juice |
| 6.0 ml | vinegar |
| 18.2 ml | water |

The rotation speed was increased to 60 rpm and 150.0 g of soy oil were added.

The emulsion prepared was heated in a double boiler pan to 86° C. then poured into a 600 ml beaker. The beaker was covered with saran wrap and room temperature equilibrated for 24 hours. The heat stability of the emulsion was assessed by taking 100 ml of the emulsion in a 500 ml beaker and heating at 100° C. on a hot plate with constant agitation until free oil became separated from the emulsion. Timing was started when the emulsion reached 95° C. and it was found that the emulsion was stable for 55 min and 42 s.

COMPARATIVE EXAMPLE

A Hollandaise sauce was prepared in a similar manner to that described in Example 7 except that the modified egg yolk was prepared in the following manner:

100 g of egg yolk (salted, 10%) at 1°–5° C. was charged to a Lee kettle and 0.033 g Phospholipase A in aqueous solution was added and the mixture was mixed for 15 minutes and incubated for 3–4 weeks at 3°–4° C. and at pH 6.1.

Using the same heat stability test as described in Example 7, the Hollandaise sauce emulsion was found to be stable for only 27.5 minutes i.e. less than half as long as using an enzyme modified egg yolk according to the process of the present invention.

We claim:

1. A process for preparing an emulsifying agent consisting essentially of sequentially treating egg yolk with a protease at a pH from 4 to 8.5 and at a temperature from 0° C. to 65° C. and then treating the protease-treated egg yolk with a pancreatic lipase at a pH from 4 to 8.5 and at a temperature from 0° C. to 60° C.

2. A process according to claim 1 further comprising pasteurizing the egg yolk after treating the egg yolk with lipase.

3. A process according to claim 1 further comprising pasteurizing the egg yolk during the treatment of the egg yolk with lipase.

4. A process according to claim 1 wherein the egg yolk is fresh egg yolk.

5. A process according to claim 1 wherein the egg yolk is frozen egg yolk.

6. A process according to claim 1 wherein the egg yolk is dehydrated egg yolk.

7. A process according to claim 1 further comprising heating the egg yolk before treatment with protease.

8. A process according to claim 1 wherein the egg yolk is treated with protease, and with lipase, at a temperature of from 35° C. to 43° C.

9. A process according to claim 1 wherein the egg yolk is treated with protease, and with lipase, at a temperature from 37° C. to 43° C.

10. A process according to claim 1 wherein the egg yolk is treated with an amount of protease from 0.025% to 2% by weight based on a weight of the egg yolk and wherein the egg yolk is treated with an amount of lipase from 0.025% to 3% by weight of the egg yolk.

11. A process according to claim 1 wherein the protease-treated egg yolk is treated with pancreatic lipase at a pH from 4.5 to 7.5.

12. A process according to claim 1 wherein the protease-treated egg yolk is treated with an amount of lipase from 0.075% to 1% by weight of the egg yolk.

13. A process for preparing an emulsifying agent consisting essentially of sequentially treating egg yolk with a pancreatic lipase at a pH from 4 to 8.5 and at a temperature from 0° C. to 60° C. and then treating the lipase-treated egg yolk with a protease at a pH from 4 to 8.5 and at a temperature from 0° C. to 65° C.

14. A process according to claim 13 further comprising pasteurizing the egg yolk after the treatment of the egg yolk with protease.

15. A process according to claim 13 wherein the egg yolk is fresh egg yolk.

16. A process according to claim 13 wherein the egg yolk is frozen egg yolk.

17. A process according to claim 13 wherein the egg yolk is dehydrated egg yolk.

18. A process according to claim 13 further comprising heating the egg yolk before treatment with lipase.

19. A process according to claim 13 wherein the egg yolk is treated with lipase, and with protease, at a temperature from 35° C. to 45° C.

20. A process according to claim 13 wherein the egg yolk is treated with lipase, and with protease, at a temperature from 37° C. to 43° C.

21. A process according to claim 13 wherein the egg yolk is treated with an amount of lipase from 0.025% to 3% by weight based on a weight of the egg yolk and wherein the egg yolk is treated with an amount of protease from 0.025% to 2% by weight of the egg yolk.

22. A process according to claim 13 wherein the egg yolk is treated with pancreatic lipase at a pH from 4.5 to 7.5

23. A process according to claim 13 wherein the lipase-treated egg yolk is treated with an amount of protease from 0.025% to 2% by weight of the egg yolk.

* * * * *

UNITED STATES PATENT AND TRADEMARK OFFICE
CERTIFICATE OF CORRECTION

PATENT NO. : 5,213,968

DATED : May 25, 1993

INVENTOR(S) : CASTLE, et al.

It is certified that error appears in the above-identified patent and that said Letters Patent is hereby corrected as shown below:

Column 6, line 29 (line 3 of claim 8), "43°C" should be --45°C--.

Signed and Sealed this

Twenty-eighth Day of December, 1993

Attest:

BRUCE LEHMAN

Attesting Officer

Commissioner of Patents and Trademarks